July 21, 1953    E. C. GREGG, JR    2,646,547
RECORDING WATTMETER
Filed July 6, 1950
FIG. I.
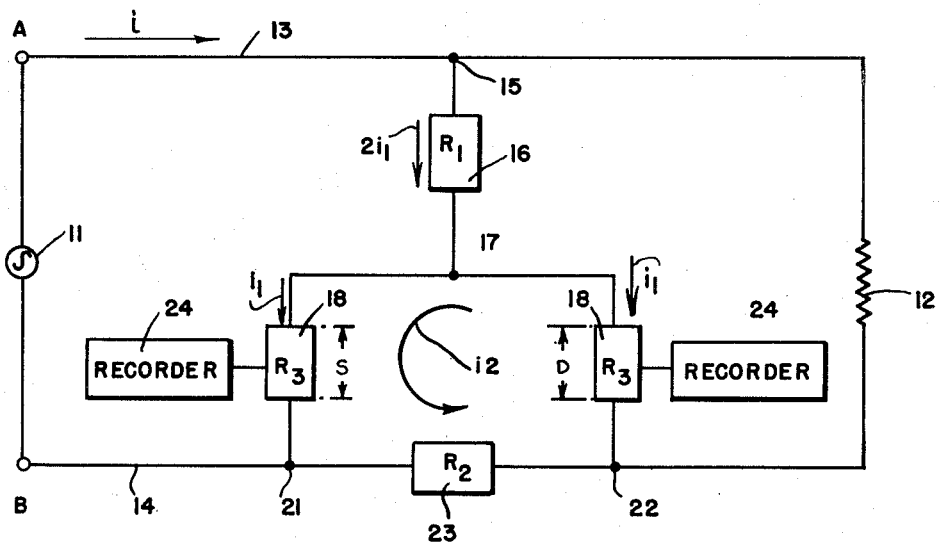
FIG. 2.
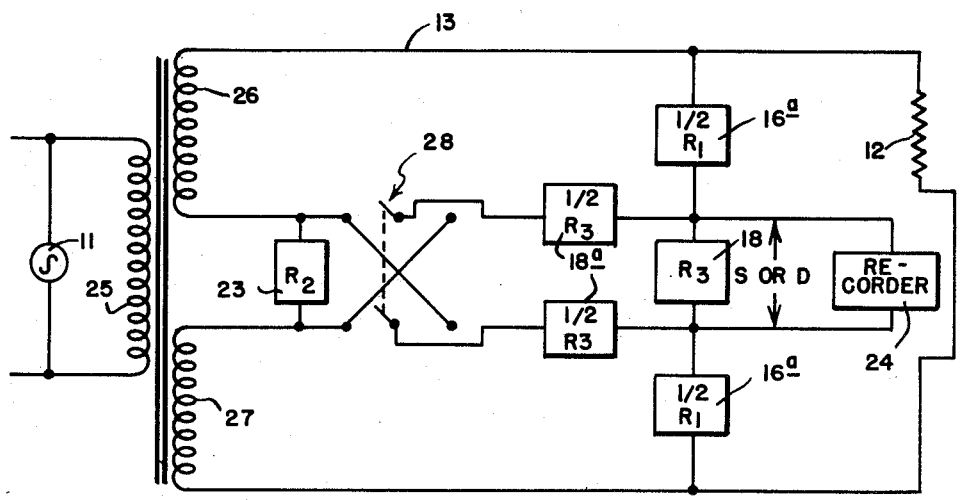
INVENTOR
EARLE C. GREGG, JR.
BY
ATTORNEYS Patented July 21, 1953

2,646,547

UNITED STATES PATENT OFFICE 2,646,547

RECORDING WATTMETER

Earle C. Gregg, Jr., East Cleveland, Ohio, assignor to the United States of America as represented by the Secretary of the Navy Application July 6, 1950, Serial No. 172,259

6 Claims. (Cl. 324—142)

1

The present invention relates to a recording wattmeter and more particularly to a wattmeter capable of measuring relatively high frequency electrical power in both balanced and unbalanced circuits.

The measurement of high frequency electrical power is entirely beyond the capabilities of the ordinary wattmeters, which are strictly low frequency devices. Since the impedance of many devices changes with power, these determinations of power input into the devices, based on impedance bridge tests at very low levels, could at best only give approximate results. The need, consequently, was great to have a means for measuring actual power input directly, and to take care of these needs the present invention has been developed for the measurement of power over the large frequency range such as may be used in underwater acoustic measurements.

Wattmeters, employing resistors, thermocouples, and a meter for reading power as a function of the currents generated by the thermocouples have been designed. However, while the thermocouple wattmeter is direct reading and fairly accurate, it still possesses a number of disadvantages, the most important of which are: (1) the fact that thermal lags necessitate a delay in reading, which makes necessary point by point measurements; (2) the possibility of destruction of the thermocouples, resulting from sudden changes in load impedance; and (3) the limited impedance range for any one power scale. These difficulties are largely overcome in the design of the wattmeter of the present invention.

One of the principal objects of the present invention is to provide means for measuring power in a load circuit over a relatively wide range of frequencies. Another object is to provide means whereby power, voltage, or current in a load circuit may be measured as desired. Another object is to provide means which is not delayed by thermal lag when it measures power. Yet another object is to provide means for measuring power in both balanced and unbalanced circuits.

With these and other objects in view, as will hereinafter more fully appear, and which will be more particularly pointed out in the appended claims, reference is now made to the following description taken in connection with the accompanying drawings in which:

Fig. 1 is a schematic circuit diagram of one embodiment of the invention when used in an unbalanced circuit; and Fig. 2 is a schematic circuit diagram of one embodiment of the invention when used in a balanced circuit.

Referring now to the drawings, wherein like reference characters designate like or corresponding parts throughout the several views, there is shown in Fig. 1 a source 11 of alternating current power which is connected to terminals A and B so as to furnish power to an unbalanced load circuit 12 by means of power lines 13 and 14. Connected between lines 13 and 14 so as to be parallel to load circuit 12, across source 11, is a substantially Y-shaped circuit for measuring the power supplied to the load. This Y-shaped circuit comprises one embodiment of the present invention.

Connected to line 13 at point 15, and forming the leg portion of the Y-circuit, is an impedance device 16 which joins, at common point 17, one terminal of each of two other impedance devices 18. It is to be noted that the impedances 18 are equal in value and each one forms an arm for the Y-circuit. Devices 18 join power line 14 at points 21 and 22 respectively, while between junction points 21 and 22, and connected in series with line 14, is another impedance device 23. Directly connected to either of the impedances 18 is a recorder 24, which may be of any conventional design known to those skilled in the art, and whose operation will be more fully described hereinafter.

When the invention is employed to measure power in a balanced circuit the arrangement is shown in Fig. 2 wherein the power source 11 is connected to the primary 25 of a transformer having two secondary windings 26 and 27 which are arranged to supply power to the load circuit 12. One terminal of secondary winding 26 is joined to line 13 while its other terminal connects with one side of impedance 23 which is placed in series between the two secondary windings. Secondary winding 27 joins line 14 and the other side of impedance 23.

Also connected across the terminals of impedance 23 is a double-pole double-throw switch 28 which is cross connected so that it functions as a reversing switch. Each of the arms of switch 28 is tied to an impedance 18A, while between the terminals of these impedances, there is placed impedance 18, and it can be clearly seen from the notations on Fig. 2 that the values of impedances 18A are selected as exactly one-half that of impedance 18. On either side of impedance 18, and connected between it and the lines 13 and 14 respectively, is an impedance 16A which, it will be noted, is taken to be one-half the value of impedance 16 of the modification shown in Fig. 1. The impedances of the present invention bear a definite predetermined relation relative to each other, and it is obvious from Fig. 2 that while the relation between these values is maintained, at the same time, a balanced circuit is obtained by equally dividing some of these impedances and putting half on each side of the circuit.

Connected across impedance 18 (Fig. 2) is a recorder 24 for recording either the sum or difference of the currents flowing through 18, depending upon the position of switch 28. It may be mentioned at this point that should it be desirable to have the wattmeter of the present invention used as a portable instrument, that the recorder 24 may be replaced by an amplifier and meter without otherwise altering the operation of the device or its accuracy.

Before considering the operation of the invention, the theory behind it will be mentioned. In the measurement of power with a recording wattmeter of the instant type, two sinusoidal signals, designated S and D are obtained and recorded. The S signal is the sum of a signal, $ni$, proportional to the current $i$, and a signal, $me$, proportional to the voltage $e$. The D signal is the difference between these current and voltage signals. It can be shown that $$\frac{S^2}{4mn} - \frac{D^2}{4mn} = ei \cos \theta = \text{power}$$

where $\theta$ is the phase angle between the current and voltage. The S and D signals are recorded on the intermediate frequency recording systems in the usual manner. In the circuit of the invention, the measurement of total power is correct only for sinusoidal wave forms, and as previously mentioned for portable use a separate amplifier and meter may be used in place of the recorder.

Figs. 1 and 2 show the basic circuits of the recording wattmeter used in obtaining the S and D terms for unbalanced and balanced circuits. In the actual circuit for the unbalanced case (Fig. 1) a coil and a pad (small adjustable condenser) are used for either of the impedances 18 in order to obtain the S or D signal; which is measured across the impedance 18 as clearly illustrated in Fig. 1. Should it be desirous to measure only the voltage and current components they may be obtained by short circuiting impedance 23 and disconnecting impedance 16, respectively. By short circuiting 23, there remains only impedances 16 and 18, connected across the line, in parallel with load 12, so as to give a measure of the voltage across the load. When impedance 16 is disconnected, then the reading obtained is the current flowing through 23 and this is proportional to the current through load 12 since impedance 23 functions as a shunt in line 14 to tap off a proportionate part of the load current.

In the balanced condition (Fig. 2), the only new factor that need be considered is the stray capacity between the two high potential terminals of the driving coil. The effect of the stray capacity may in general be neglected for the usual load impedances encountered. The impedance of the secondary windings will have no effect on the measurements of power.

It can also be shown that if impedance 23 is center-tapped to ground, the meter will measure the power delivered to both the load impedance and the impedance to ground. However, if no ground connection is made (as shown in Fig. 2), the meter will read the load dissipation independent of the degree of unbalance.

The S or D signal, depending upon the direction in which the reversing switch 28 is thrown, will appear across impedance 18 (consisting of a pad plus coil). Voltage and current components are obtained in the same manner as in the unbalanced case of Fig. 1, namely, by shorting impedance 23 and disconnecting impedances 16A, respectively.

In operation, when the power source is furnishing power to load 12, and the device is being used to measure this power, then current flow in the various branches of the circuit is in the directions shown in Fig. 1, for example. Kirchoff's law will apply. Assuming the total current in the system to be $i$, and flowing to the right (Fig. 1), and neglecting the effect of impedance $R_2$ for the moment, then the current through 16 will be downward and equal to $2i_1$, with equal current components $i_1$, flowing through each of the impedances 18. However, due to the potential drops around the circuit and across impedance 23, there is another current, $i_2$, flowing counterclockwise around the arms of the Y-shaped portion of the circuit. It is obvious then that the signal measured across the right-hand impedance 18 will be equal to D, or the difference between the two currents $i_1$, and $i_2$, while the signal across the left-hand impedance will be equal to S, or the sum of the currents $i_1$, and $i_2$. Likewise, in Fig. 2, it can be shown that a similar S or D signal will appear across impedance 18 depending upon the position of switch 28. Therefore, once the sum and difference signals have been gotten the power can be obtained.

In some embodiments of the wattmeter, the system can be changed from the balanced condition to an unbalanced condition by a switch on the front panel. In actual operations the wattmeter is frequently employed to measure power in underwater acoustical experiments and four records are obtained on the chart paper; viz., S, D, E and I. Since the levels are recorded in decibels versus $10^{-16}$ watts, the subtraction of a proper constant, K, from the recorded S level will give $$\frac{S^2}{4mn}$$

in decibels versus one watt. The same procedure and the same constant are used to obtain the D reading, and thus when these two readings are converted to watts, the difference between them will be the power delivered to the load. Similar procedures are used to convert the voltage signal to decibels versus one volt and the current signal to decibels versus one ampere.

It can be shown that the errors in reading the wattmeter are a function of the ratio $me/ni$, or the ratio of the voltage signal to the current signal, and so three impedance ranges have been incorporated to keep these errors to a minimum. If the records of current and voltage differ by more than 6 to 8 decibels in a particular region, selection of the impedance range which brings the two signals closer together, and hence improves the accuracy of the power reading, is made by means of a switch on the wattmeter.

The only element determining the frequency characteristic of the wattmeter is the insertion loss of the coil replacing the impedance 18, and this will appear as a variation, with frequency, of the conversion constants. The variation in the conversion constants over the frequency range of 50 cycles to 150 kc. is less than 0.4 decibel.

The wattmeter of the present invention may be used over a power range of 0.001 watt to 1500 watts with an accuracy on the order of one to four percent for phase angles up to 85 degrees. The total impedance range is from 15 to 800 ohms.

In the light of the above disclosure, it can be seen that the wattmeter of the present invention represents a definite improvement over the prior art devices and offers a simple and reliable means for measuring power in both balanced and unbalanced circuits. It may be used to read power, voltage or current, as desired, and contains no thermal elements which may be easily damaged and which inserts a thermal lag into the readings.

It should be understood, of course, that the foregoing disclosure relates to only a preferred embodiment of the invention and that it is intended to cover all changes and modifications of the examples of the invention herein chosen for the purposes of the disclosure, which do not constitute departures from the spirit and scope of the invention as set forth in the appended claims.

What is claimed is:

1. In combination with a power circuit, a transformer having a pair of secondary windings connected to a load, a first impedance in series connection between the secondary windings, a second impedance and two first small impedances in series relation connected across the series connected secondary windings, said second impedance being positioned between said small impedances, switching means connecting the first and second impedances in parallel, and a second small impedance in each of the leads connecting the switching means and the second impedance.

2. The combination of claim 1 wherein each of the said second small impedances is one-half the value of the second impedance.

3. In combination with a power circuit, a transformer having a pair of secondary windings with a first large impedance in series therebetween, a load across the secondary windings, a second large impedance positioned between two first small impedances and in series therewith to form a path parallel to the load, a second small impedance connected to each terminal of the second large impedance, and a reversing switch between the first large impedance and the second small impedances whereby a sum or difference signal proportional to the current and voltage of the load appears across the second large impedance.

4. The combination of claim 3 wherein said reversing switch has connections and selective positions determining whether a sum or difference signal appears across the second large impedance.

5. A measuring circuit of a type described for use with A. C. power, comprising a circuit comprising conductors adapted to be connected to a load, said circuit including an impedance in series relationship with said conductors, a second impedance and two substantially equal impedances connected in series relation across said conductors, said second impedance being connected between said substantially equal impedances, a pair of leads, reversing switching means connected to the ends of said first impedance and to said pair of leads, said leads being connected across said second impedance, and a further impedance in each of said leads, said further impedances being substantially equal.

6. A measuring circuit as defined in claim 5 but further characterized by each of said further impedances being substantially one-half of said second impedance.

EARLE C. GREGG, Jr.

References Cited in the file of this patent

UNITED STATES PATENTS

| Number | Name | Date |
|---|---|---|
| 2,059,594 | Massa | Nov. 3, 1936 |

FOREIGN PATENTS

| Number | Country | Date |
|---|---|---|
| 328,035 | Great Britain | Apr. 14, 1930 |
| 511,367 | Great Britain | Aug. 17, 1939 |
| 708,949 | Germany | Aug. 1, 1941 |